United States Patent

[11] 3,618,878

| [72] | Inventors | James A. Klein<br>Santa Monica;<br>Lowell O. Lykken, Westlake Village; Naren M. Shah, Santa Monica, all of Calif. |
|---|---|---|
| [21] | Appl. No. | 835,513 |
| [22] | Filed | June 23, 1969 |
| [45] | Patented | Nov. 9, 1971 |
| [73] | Assignees | Lear Siegler, Inc.<br>Santa Monica, Calif.<br>by said Lykken and Shah;<br>Collins Radio Company<br>Dallas, Tex., by said Klein |

[54] AIRCRAFT THROTTLE CONTROL
15 Claims, 1 Drawing Fig.
[52] U.S. Cl. .................................................. 244/77 D, 244/77 A
[51] Int. Cl. .................................................. B64c 13/18
[50] Field of Search ...................................... 244/77, 77 A, 77 D, 42.6

[56] References Cited
UNITED STATES PATENTS

| 2,875,965 | 3/1959 | Anderson et al. | 244/77 D |
| 3,533,579 | 10/1970 | Moller | 244/77 D |
| 2,627,384 | 2/1953 | Esval | 244/77 D |
| 2,953,327 | 9/1960 | Clement et al. | 244/77 D |
| 3,275,269 | 9/1966 | Yiotis | 244/77 D |
| 3,313,152 | 4/1967 | Kulda et al. | 244/77 D X |
| 3,399,849 | 9/1968 | Hendrick | 244/77 D |
| 3,486,722 | 12/1969 | Greene | 244/77 D |

Primary Examiner—Milton Buchler
Assistant Examiner—Jeffrey L. Forman
Attorney—Christie, Parker & Hale ABSTRACT: An aircraft controlled in part during descent or ascent by spoilers in the vertical direction, uses a throttle control signal that is derived from the outputs of an angle of attack sensor and a spoiler position sensor. As a result, the changes in the angle of attack occasioned by the movement of the spoilers are compensated. When the aircraft is held on a predetermined flight path and also controlled in part by an elevator in the vertical direction, the output of an elevator position sensor also contributes to the resultant throttle control signal as a long-period anticipatory term.

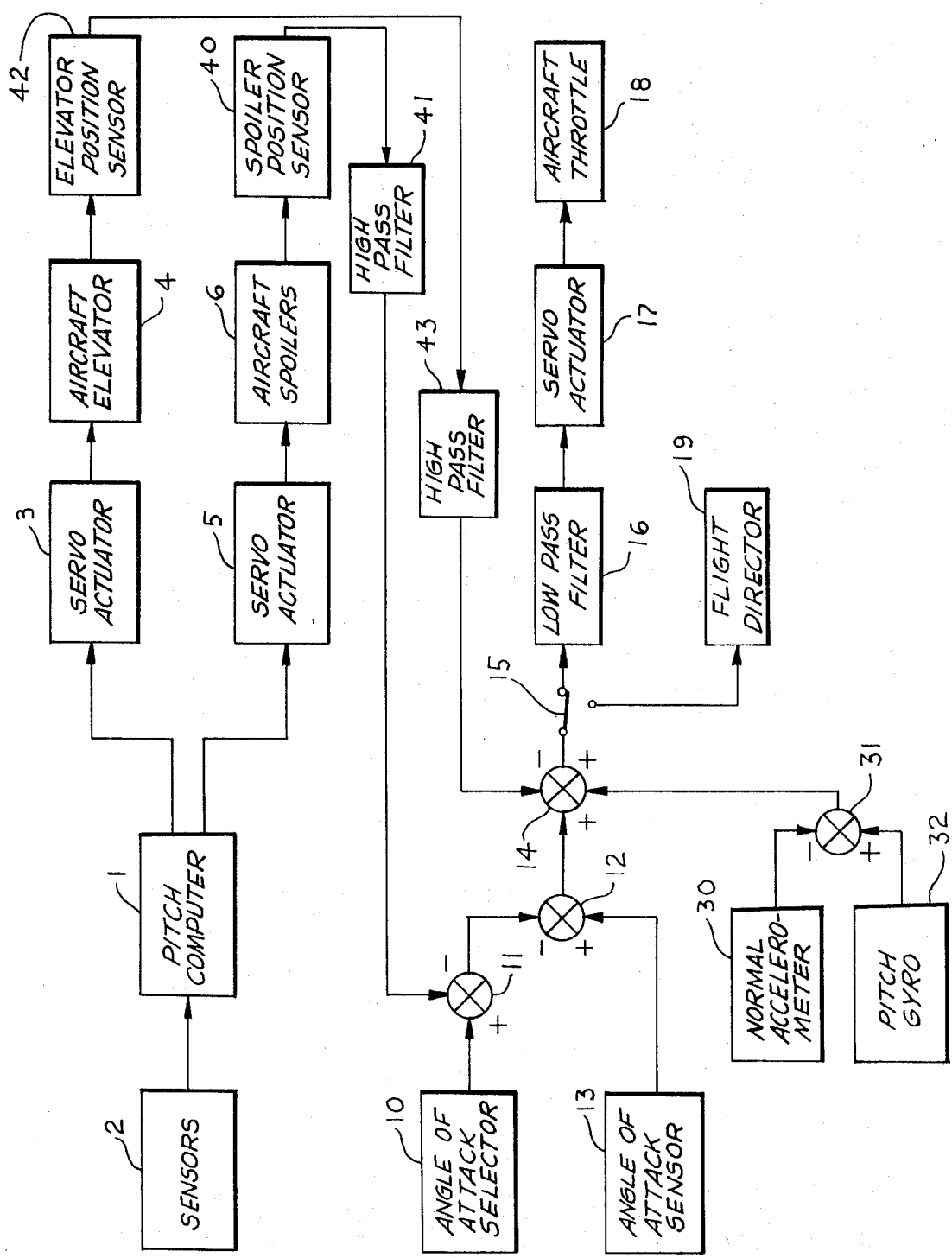

AIRCRAFT THROTTLE CONTROL

BACKGROUND OF THE INVENTION

This invention relates to aircraft flight control and, more particularly, to aircraft throttle control during a descent or ascent maneuver.

In the aircraft flight control field, it is common practice to generate a throttle control signal to assist in the control of the throttle during ascent and descent maneuvers. Typical maneuvers of this type used in modern commercial aviation are approach and landing. The throttle control signal is either used as a command signal in an automatic throttle control system or as a driving signal for an instrument that informs the pilot how to control the throttle manually.

During landing, the desideratum is to have the aircraft moving as slowly as possible at touchdown without causing stall or loss of stability prior thereto. In general, an aircraft parameter that influences proper throttle position of the aircraft during landing to achieve the desideratum is utilized to command the throttle. Indicated airspeed, lift, and angle of attack are such parameters. Assuming, for example, the utilized aircraft parameter is angle of attack, an angle of attack selector produces a signal representative of the desired value of angle of attack and an angle of attack sensor produces a signal representative of the actual value of angle of attack. The aircraft throttle is actuated responsive to the difference between these signals, thereby correcting the discrepancies between the desired and actual values of angle of attack.

A signal representative of the forward acceleration of the aircraft is commonly combined with the output of the angle of attack sensor as a damping term that in effect anticipates and corrects for unwanted long-period fluctuations in the actual angle of attack. This permits more precise automatic or manual control of the throttle position. As a rule, special measures must be taken to eliminate the influence of the aircraft's pitch attitude on the output of the acceleration sensor. Further, if a forward acceleration sensor is not used on the aircraft for some other purpose, one must be provided especially for throttle control.

Conventionally, an aircraft is controlled in the vertical direction by adjusting the position of its elevator, which is a control surface located at the tail of the aircraft. When the elevator is moved away from its streamlined position, the aircraft rotates about its pitch axis and changes its pitch attitude. Due to the fact that the aircraft has a new pitch attitude, the indicated airspeed and the angle of attack of the aircraft also change. Generally, the response of an aircraft in the vertical direction to movements of the elevator is rather slow. In some aircraft, the control afforded by the elevator in the vertical direction is augmented by movement of the spoilers, which are control surfaces located on the wings of the aircraft near the center of gravity. The response of an aircraft in the vertical direction to movements of the spoilers is much faster than to the elevator. Since the spoilers are located on the principal lift-producing surface of the aircraft and are near its center of gravity, they essentially control the flight path of the aircraft in the vertical direction by varying the lift of the aircraft directly without an immediate change in pitch attitude. Hence, the term that has been coined to describe the control of an aircraft in the vertical direction by the spoilers is "direct lift." As the aircraft is controlled in the vertical direction by direct lift, the angle of attack changes without affecting the indicated airspeed appreciably, so a new angle of attack represents the desired throttle position during a descent or ascent maneuver.

SUMMARY OF THE INVENTION

One aspect of the invention involves the generation of a throttle control signal for an aircraft that is controlled in part by direct lift in the vertical direction during an ascent or descent maneuver. The changes in the angle of attack of the aircraft occasioned by direct lift are indicated by the movement of the spoilers. The throttle control signal for the aircraft is produced by combining the output of an angle of attack sensor and a spoiler position sensor. Consequently, the throttle control signal remains essentially unaffected by the changes in angle of attack due to direct lift control. The spoiler position sensor in effect exercises short period corrective action on the throttle control signal, because the response of the aircraft to spoiler movement is fast.

Another aspect of the invention involves the production of an anticipatory signal that damps excess throttle activity while an aircraft is descending or ascending along a predetermined path. It has been discovered that the movements of the elevator of the aircraft required to hold it on the predetermined path are related to the desired changes in throttle position for preventing aircraft stall. In fact, the elevator movements anticipate the output of the primary sensor, e.g., angle of attack sensor or indicated airspeed sensor, from which the throttle control signal is derived. Accordingly, to produce the throttle control signal, the output of an elevator position sensor is combined with the output of the primary sensor, which senses the actual value of the aircraft throttle control parameter. The elevator position sensor in effect exercises long-period corrective action on the throttle control signal. By utilizing the output of the elevator position sensor, which is found aboard virtually any aircraft in which the elevator is positioned by a servo actuator, it becomes unnecessary to provide a special sensor to generate the anticipatory signal. It also becomes unnecessary to compensate the sensor response for the pitch attitude of the aircraft.

BRIEF DESCRIPTION OF THE DRAWING

The features of a specific embodiment of the best mode contemplated of carrying out the invention are illustrated in the drawing, the single FIGURE of which is a block schematic diagram of flight control equipment on board an aircraft.

DETAILED DESCRIPTION OF THE SPECIFIC EMBODIMENT

In the drawing are the components of part of a flight control system located on board an aircraft. This part of the flight control system is designed to position the throttle of the aircraft and the control surfaces that influence the aircraft in the vertical direction during an ascent or descent maneuver. For the purposes of discussion, it is assumed that the aircraft is landing at an airport that has glide slope beam-transmitting equipment.

A pitch computer 1 generates two command signals for the control surfaces from information furnished by sensors 2. One of the command signals from pitch computer 1 is coupled to a servo actuator 3 that drives an aircraft elevator 4. The other command signal from pitch computer 1 is coupled to a servo actuator 5 that drives aircraft spoilers 6. The command signals generated by pitch computer 1 for elevator 4 and spoilers 6 would, in general, be related to one another, although the spoiler command signal would be applied to servo actuator 5 through a high pass filter to limit spoilers 6 to short period control. In some cases, the same command signal could be used to actuate both control surfaces. Pitch computer 1, sensors 2, and servo actuators 3 and 5 operate in a well-known manner to position elevator 4 and spoilers 6 such that the aircraft remains on the path of the glide slope beam. By way of example, sensors 2 could comprise a glide slope receiver that produces a glide slope error signal, an altimeter whose output is differentiated to produce a vertical speed signal, and a pitch rate gyro. Pitch computer 1 could process the information furnished by sensors 2 in any well-known manner. Reference is made to K. C. Kramer et al. U.S. Pat. No. 3,291,421, which issued Dec. 13, 1966, for a suitable configuration of pitch computer 1. Another suitable configuration of pitch computer 1 is disclosed in FIG. 2 of a patent application entitled "Aircraft Flight Control Apparatus," Ser. No. 835,528, now abandoned, filed concurrently herewith in the names of Lowell Lykken and Naren Shah.

The term "vertical direction" in this specification refers to the direction in which the force of gravity acts. The term "elevator" in this specification refers to a control surface for the vertical direction which is located at the tail of the aircraft, i.e., a substantial distance from the center of gravity of the aircraft. Thus, when the elevator moves away from its streamlined position, the aircraft pivots about its pitch axis and assumes a new angle of attack. Aircraft are known in which the entire horizontal stabilizer is pivotable as the control surface for the vertical direction. The term "elevator" also includes such a control surface. The term "spoilers" in this specification refers to movable control surfaces on the wings of the aircraft, i.e., control surfaces near the center of gravity of the aircraft. The spoilers on opposite wings of an aircraft are conventionally moved in opposition to one another during a roll maneuver to improve lateral control. In addition to this conventional use, the spoilers are moved together in the flight control system disclosed herein during descent and ascent maneuvers to change directly the lift exerted on the aircraft, and thereby change the position of the aircraft in the vertical direction. The operation of the spoilers in this manner is referred to in this specification as "direct lift." Partial control of the aircraft in the vertical direction is achieved by direct lift without substantial change in the pitch attitude of the aircraft.

The throttle control section of the flight control system operates upon the parameter angle of attack. The term "angle of attack" in this specification includes aircraft lift, which is directly related to angle of attack. The output of an angle of attack selector 10 is coupled through a summing junction 11 to one input of a summing junction 12. The output of an angle of attack sensor 13 is coupled directly to the other input of summing junction 12, where it is combined differentially with the output of selector 10, as indicated by the mathematical signs in the drawing. Selector 10, which produces a signal representative of the desired angle of attack of the aircraft or the desired lift exerted on the aircraft, could be a fixed signal source or a variable signal source that is adjusted by the pilot. Alternatively, in some cases it could be a variable signal source that is modified responsive to the dynamics of the aircraft. Sensor 13 is a conventional sensor that produces a signal representative of the actual angle of attack of the aircraft or the actual lift exerted on the aircraft.

The output of summing junction 12 is coupled through a summing junction 14 to a switch 15. The output of summing junction 14 is a throttle control signal that can be used to control the aircraft throttle automatically or to drive an instrument that enables the pilot to control the throttle manually. This throttle control signal represents in part the difference between the desired value of the angle of attack determined by selector 10 and the actual value of angle of attack indicated by sensor 13. When switch 15 is in its upper position, as shown in the drawing, the throttle control signal is coupled through a low pass filter 16 to the input of a servo actuator 17. Low pass filter 16 serves to suppress rapid fluctuations in the throttle control signal. Servo actuator 17 drives the aircraft throttle, which is represented by a block 18 in the drawing. When the pilot wants to control the throttle manually, switch 15 is placed in its lower position so the throttle control signal is coupled to a flight director 19, which includes an instrument providing the pilot with a visual indication of the throttle control to be introduced.

The output of a normal accelerometer 30 is coupled to one input of a summing junction 31, where it is combined differentially with the output of a pitch gyro 32, as represented by the mathematical signs in the drawing. As represented by the mathematical signs in the drawing, the output of summing junction 31 is additively combined with the output of summing junction 12 at summing junction 14. The signals provided by normal accelerometer 30 and pitch gyro 32 are anticipatory terms for the throttle control signal.

In choosing the value of angle of attack of selector 10, the prime consideration is stall or loss of stability. In other words, the angle of attack that results in the aircraft moving as slowly as possible on approach and at touchdown without causing stall or loss of stability prior thereto is the desideratum for setting selector 10. By differentially combining the outputs of selector 10 and sensor 13, a throttle control signal is produced that represents the deviation of the actual angle of attack from the selected value thereof. This deviation does not truly indicate the proper throttle activity, however, because the direct lift control exercised by spoilers 6 changes the angle of attack of the aircraft without immediately affecting the indicated airspeed A spoiler position sensor 40, which could be a preexisting component in the servo loop that positions spoilers 6, produces a signal that represents the movement of spoilers 6. The output of sensor 40 is coupled through a high pass filter 41 to one input of summing junction 11, where it is differentially combined with the output of selector 10, as illustrated by the mathematical signs in the drawing. The function of high pass filter 41 is to eliminate drift and long period effects. Since the positional changes of spoilers 6 represent direct lift control exercised on the aircraft, the output of sensor 40 modifies the output of selector 10 to reflect changes in the angle of attack attributable to direct lift control. The aircraft responds quickly in the vertical direction to the spoiler movements. This response is controlled by providing the spoilers with rather limited authority and by high pass filtering the spoiler command signal, as described above. Thus, spoiler position sensor 40 provides short period damping that corrects the adverse effects of direct lift on the throttle control signal.

In the past, a signal representative of forward acceleration of the aircraft, has been employed as a long-period anticipatory term in forming a throttle control signal. It has now been discovered that the changes in position of elevator 4 are related to the desired changes in position of the aircraft throttle, and specifically that these changes are anticipatory of the desired throttle position. This relationship exists because there is cross coupling between the throttle control and the elevator surface control that is required to maintain the aircraft on the glide slope path during landing. In other words, as the elevator control surface is positioned so as to maintain the aircraft on the glide slope path, the throttle position required to maintain the optimum angle of attack, i.e., to prevent stall, also changes. For example, assuming an atmospheric disturbance momentarily raises the aircraft above the center of the glide slope beam, pitch computer 1 reacts by commanding elevator 4 to pitch the aircraft down toward beam center. As the aircraft gradually responds to this pitch down command, the angle of attack is reduced. Accordingly, due to the response time of the aircraft, the pitch command and, therefore, the elevator movement, anticipates this reduction in the angle of attack, and causes the throttle to retard, thereby counteracting the increase in indicated airspeed attributable to the reduced angle of attack. An elevator position sensor 42 produces a signal that represents the position of elevator 4. Sensor 42 could be a preexisting component in the servocontrol loop that positions elevator 4. To provide anticipation for the development of the throttle control signal, the output of elevator position sensor 42 is coupled through a high pass filter 43, to one input of summing junction 14, where it is differentially combined with the outputs of summing junctions 12 and 31, as illustrated by the mathematical signs in the drawing. The function of high pass filter 43 is also to eliminate drift and additionally to eliminate the steady state trimmed elevator position. It is to be noted that this aspect of the invention is applicable to throttle control based on other parameters than angle of attack. For example, the output of the elevator position sensor could be used as an anticipatory signal to modify the output of an indicated airspeed sensor.

Since the aircraft responds slowly to movements of elevator 4, elevator position sensor 42 exercises long-period corrective action on the throttle control signal. In other words, the anticipatory movements of elevator 4 are employed to damp or suppress potential long-period changes in the actual angle of attack of the aircraft. In general, the spoiler position sensor would not be suitable as an anticipatory term because it represents too short a period, and, if a trim tab surface were provided on the aircraft, its position sensor would not be suitable as an anticipatory term because in general it represents too long a period. However, in theory it is the output of pitch computer 1 that actually anticipates the desired throttle position, so depending on the circumstances, and control surface sensor that the vertical direction can possibly be used.

The elevator positional information can also be used for long-period damping of the throttle control signal as described above during any ascent or descent maneuver. This aspect of the invention is not limited to aircraft flight along a glide slope beam or even a predetermined path. For example, the elevator positional information anticipates the desired throttle activity while the pilot is making an unassisted approach or landing along a path determined by the pilot visually as he flies.

In the drawing, four separate summing junctions are shown for the purposes of illustrating the functions of the various signals that are combined to form the throttle control signal. In fact, all four summing junctions could be replaced by a single summing junction where all the signals are combined or by several summing junctions where different combinations of signals are combined than shown.

Although the invention has been described in the context of a landing maneuver, the principles thereof apply to the control of the aircraft throttle during ascent and descent maneuvers generally, e.g., go-around after an abortive landing attempt.

What is claimed is:

1. Throttle control apparatus for an aircraft that exercises automatic direct lift control for the vertical direction by means of a control surface located near the center of gravity of the aircraft, the apparatus comprising:
   at least one sensor for generating a signal representative of the actual flight of the aircraft in the vertical direction;
   means responsive to the sensor signal for generating a command signal representative of the deviation of the actual flight in the vertical direction from a desired flight plan;
   means responsive to the command signal for moving the control surface so as to reduce the deviation;
   means for producing a first signal indicative of the movement of the control surface;
   means for producing a second signal indicative of the angle of attack of the aircraft; and
   means for combining the first and second signals to produce a third signal that is indicative of the desired throttle activity of the aircraft.

2. Throttle control apparatus for an aircraft that has a control surface near its center of gravity for controlling flight in a vertical direction by direct lift, the apparatus comprising:
   an aircraft throttle;
   means responsive to the position of the control surface for generating a short period damping signal that reflects the activity of the control surface;
   means for generating a control signal that reflects the deviations of the angle of attack of the aircraft from a predetermined value;
   means for generating a long-period damping signal anticipatory of the activity of the throttle;
   means responsive to the long-period damping signal and the short-period damping signal for modifying the control signal to reflect changes in the lift of the aircraft brought about by the activity of the control surface and to anticipate the activity of the throttle; and
   a throttle control device operating responsive to the modified control signal.

3. A throttle control system for an aircraft having near its center of gravity a control surface that controls flight of the aircraft in a vertical direction, the system comprising:
   first means for actuating the control surface, the first means comprising at least one sensor on board the aircraft indicative of the actual aircraft flight path, means responsive to the sensor for generating a command signal representative of the deviation between the actual aircraft flight path and a desired flight path in the vertical direction, and means responsive to the control signal for moving the control surface to reduce the deviation between the actual and the desired flight path;
   second means for sensing the movement of the control surface;
   third means for sensing the angle of attack of the aircraft;
   fourth means for producing an indication of a preselected angle of attack for the aircraft;
   a utilization device for throttle control of the aircraft; and
   fifth means responsive to the second, third and fourth means for controlling the utilization device.

4. The system of claim 3, in which the sensor on board the aircraft comprises a glide slope receiver and the means for moving the control surface maintains the aircraft on a glide slope path.

5. The system of claim 4, in which the control surface comprises the spoilers on the wings of the aircraft.

6. The throttle control system of claim 5, in which the utilization device comprises the throttle of the aircraft and a servo actuator that positions the throttle responsive to the fifth means.

7. The throttle control system of claim 5, in which the utilization device comprises an instrument that provides the pilot of the aircraft with a sensory indication of desired throttle activity.

8. The throttle control system of claim 5, in which sixth means are provided for representing the normal acceleration of the aircraft, seventh means are provided for representing the pitch attitude of the aircraft, and the fifth means is responsive to the sixth and seventh means in addition to the second, third, and fourth means.

9. The throttle control system of claim 4, in which the aircraft has substantially displaced from its center of gravity an additional control surface that controls the flight of the aircraft in a vertical direction, eighth means are provided for sensing the movement of the additional control surface, and the fifth means is responsive to the eighth means in addition to the second, third, and fourth means.

10. The throttle control system of claim 9, in which the additional control surface comprises an elevator at the tail of the aircraft.

11. A method controlling an aircraft throttle during an ascent or descent maneuver comprising the steps of:
   controlling a control surface for the vertical direction near the center of gravity of the aircraft to maintain the aircraft on a flight path by direct lift control;
   generating a first signal representative of the difference between the desired value of an aircraft parameter that influences proper throttle position of the aircraft during the maneuver and the actual value of the aircraft parameter;
   generating a second, short-period damping signal representative of the movement of the control surface of the aircraft;
   generating a third, long-period damping signal anticipatory of the throttle activity;
   combining the first, second, and third signals to produce a fourth signal; and
   adjusting the position of the aircraft throttle in accordance with the fourth signal.

12. The method claim 11, in which the first signal is generated by generating a fifth signal representative of the desired value of the aircraft parameter, generating a sixth signal representative of the actual value of the aircraft parameter, and differentially combining the fifth and sixth signals.

13. The method of claim 12, in which the desired parameter is the angle of attack of the aircraft.

14. The method of claim 11, in which the control surface is controlled to maintain the aircraft on a glide slope beam transmitted from the ground.

15. A method of controlling an aircraft throttle during an ascent or descent maneuver executed in part by direct lift control exercised by a control surface, the method comprising the steps of:

generating a first signal representative of the angle of attack of the aircraft;

generating a command signal representative of the deviation between the actual flight path during the maneuver and a desired flight path;

controlling the aircraft in the vertical direction by moving the control surface responsive to the control signal;

generating a second signal representative of the movement of the control surface; and combining the first and second signals to produce a throttle control signal representative of the optimum angle of attack.

* * * * *

PO-1050
(5/69)

UNITED STATES PATENT OFFICE
CERTIFICATE OF CORRECTION

Patent No. 3,618,878    Dated   November 9, 1971

Inventor(s)   James A. Klein, Lowell O. Lykken, & Naren M. Shah

It is certified that error appears in the above-identified patent and that said Letters Patent are hereby corrected as shown below:

Patent column 5, line 6, "and" should be --any--;

line 7, "that" should be -- the --;

Patent column 6, line 43, "A method controlling" should be --A method of controlling--;

line 63, "The method claim 11" should be --The method of claim 11--.

Signed and sealed this 15th day of May 1973.

(SEAL)
Attest:

EDWARD M. FLETCHER, JR.
Attesting Officer

ROBERT GOTTSCHALK
Commissioner of Patents